United States Patent
Weber et al.

(12)

(10) Patent No.: US 8,555,816 B2
(45) Date of Patent: Oct. 15, 2013

(54) PET WATERING DEVICE WITH FILTER

(75) Inventors: Adam Weber, Keller, TX (US); David R. Veness, Fort Worth, TX (US); Peter Schneider, Mansfield, TX (US)

(73) Assignee: Doskocil Manufacturing Company, Inc., Arlington, TX (US)

(\*) Notice: Subject to any disclaimer, the term of this patent is extended or adjusted under 35 U.S.C. 154(b) by 0 days.

(21) Appl. No.: 12/874,708

(22) Filed: Sep. 2, 2010

(65) Prior Publication Data
US 2011/0132268 A1 Jun. 9, 2011

Related U.S. Application Data

(60) Provisional application No. 61/239,315, filed on Sep. 2, 2009.

(51) Int. Cl.
*A01K 7/00* (2006.01)

(52) U.S. Cl.
USPC ............................................................ 119/74

(58) Field of Classification Search
USPC ................... 119/72, 69.5, 51.5, 259; 239/28
See application file for complete search history.

(56) References Cited

U.S. PATENT DOCUMENTS

| | | | |
|---|---|---|---|
| 2,623,367 A * | 12/1952 | Morrison | 62/249 |
| 5,200,070 A | 4/1993 | McMenamin | |
| 5,297,504 A | 3/1994 | Carrico | |
| 5,687,783 A | 11/1997 | Finnegan | |
| 5,809,934 A * | 9/1998 | Gavet | 119/52.1 |
| 6,460,483 B1 * | 10/2002 | Northrop et al. | 119/74 |
| 6,467,428 B1 | 10/2002 | Andrisin et al. | |
| 6,622,657 B2 | 9/2003 | Northrop et al. | |
| 7,089,881 B2 * | 8/2006 | Plante | 119/74 |
| 7,849,817 B1 * | 12/2010 | Warganich | 119/77 |
| 7,987,816 B1 * | 8/2011 | Walsh | 119/61.56 |
| 8,186,304 B2 * | 5/2012 | Harper | 119/74 |
| 2010/0050950 A1 * | 3/2010 | Graves et al. | 119/81 |
| 2012/0017839 A1 * | 1/2012 | Veness et al. | 119/74 |

OTHER PUBLICATIONS

International Search Report, PCT/US2010/047718, mailed Oct. 21, 2010.

\* cited by examiner

*Primary Examiner* — Kristen C Hayes
(74) *Attorney, Agent, or Firm* — Eckert Seamans Cherin & Mellott. LLC; John P. Powers

(57) ABSTRACT

An animal watering system including a water tank, interior container and base for connecting to a bowl. The interior container fluidly connects the water tank and the base/bowl. The interior container in addition to supplying water from the water tank to the bowl, also receives water from the bowl as it circulates. The interior container includes a filter to filter the water as it leaves the water tank and enters the bowl and as it flows from the bowl into the interior container.

19 Claims, 15 Drawing Sheets

PET WATERING DEVICE WITH FILTER

CROSS-REFERENCE TO RELATED APPLICATIONS

This application claims priority to Provisional U.S. Patent Application Ser. No. 61/239,315 entitled "Pet Watering Device with Filter," filed on Sep. 2, 2009.

FIELD

The present invention relates to pet feeding and watering devices. More specifically, the present invention relates to a pet watering bowl with a filtration system.

BACKGROUND

Animal drinking supplies often become polluted with particles, organisms and other materials. These materials may be in the water, as water is added to the watering supply, for instance from a hose or kitchen sink. Frequently, however, the animal itself adds a significant portion of pollutants to the water supply. For example, fur surrounding a dog's face and nose may have dirt, sticks, bugs, or the like attached. When the dog drinks the water from the bowl, pieces of fur may come in contact with the water supply, thus releasing some of the dirt, sticks, and other debris into the water supply. Additionally, many particles may be deposited into the watering supply by the environment. For example, if the water supply is located outside, leaves, dust and other particles may be blown into the water supply by the wind/rain/other elements. Current pet watering supplies filter the water before the water enters the bowl, typically as the water is poured into the bowl. Thus, the water remaining in the bowl generally does not get re-filtered and may have to be replaced in order to clean the supply and remove the particles deposited by the animal or the environment.

BRIEF SUMMARY

Certain embodiments take the form of a watering device for an animal. The watering device may include a water storage or water tank, a bowl configured to hold water and provide an animal access to the water, and a water passageway fluidly connecting the water storage and the bowl. The passageway may include a filter disposed within it, such that the filter is positioned beneath a water fill level of the bowl.

In other embodiments, a watering system for animals is disclosed. The system has a water tank, an interior container and a bowl, such that the water tank, interior container and the bowl are fluidly connected. The interior container may be configured to secure a filter, and may be positioned to be at least partially submerged within the bowl. In these embodiments, the filter may also be partially submerged within the bowl. The interior container may include at least one aperture, wherein the aperture fluidly connects the interior container to the bowl and the bowl to the interior container.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

DETAILED DESCRIPTION

Disclosed herein is an animal watering device that continuously filters the water supply. The watering device includes a water tank or supply that attaches to an interior container. The water tank and interior container sit within a base; the base secures the water tank and interior container together and supports the system. The base additionally may include a bowl configured to store water as well as provide the animal to access the water. The bowl may have an open aperture that fills with water from the water tank and interior container. The inner container sits below the water tank, and water flows from the water tank through the interior container and into the bowl. Additionally, the interior container may be positioned to located slightly above the bottom of the base, such that water can flow through the base and underneath the interior container, while still allowing the interior container to be partially submerged within the bowl. The interior container may secure a filter at its bottom portion. In these embodiments, the filter may be located beneath the water line when the bowl is full or substantially full. The bottom portion of the interior container also contains apertures or holes at the bottom, allowing water in the bowl to fluidly connect to the interior container and the water tank. In other embodiments, the interior container may contain filtering apertures along its sidewalls with a filtering material secured therein, such that water may flow between the base into ht interior container via the sidewalls and be filtered. Furthermore, water in the bowl may continuously flow through the filter in the interior container, via the apertures and the water in the bowl may be re-circulated past the filter.

Figure 1:
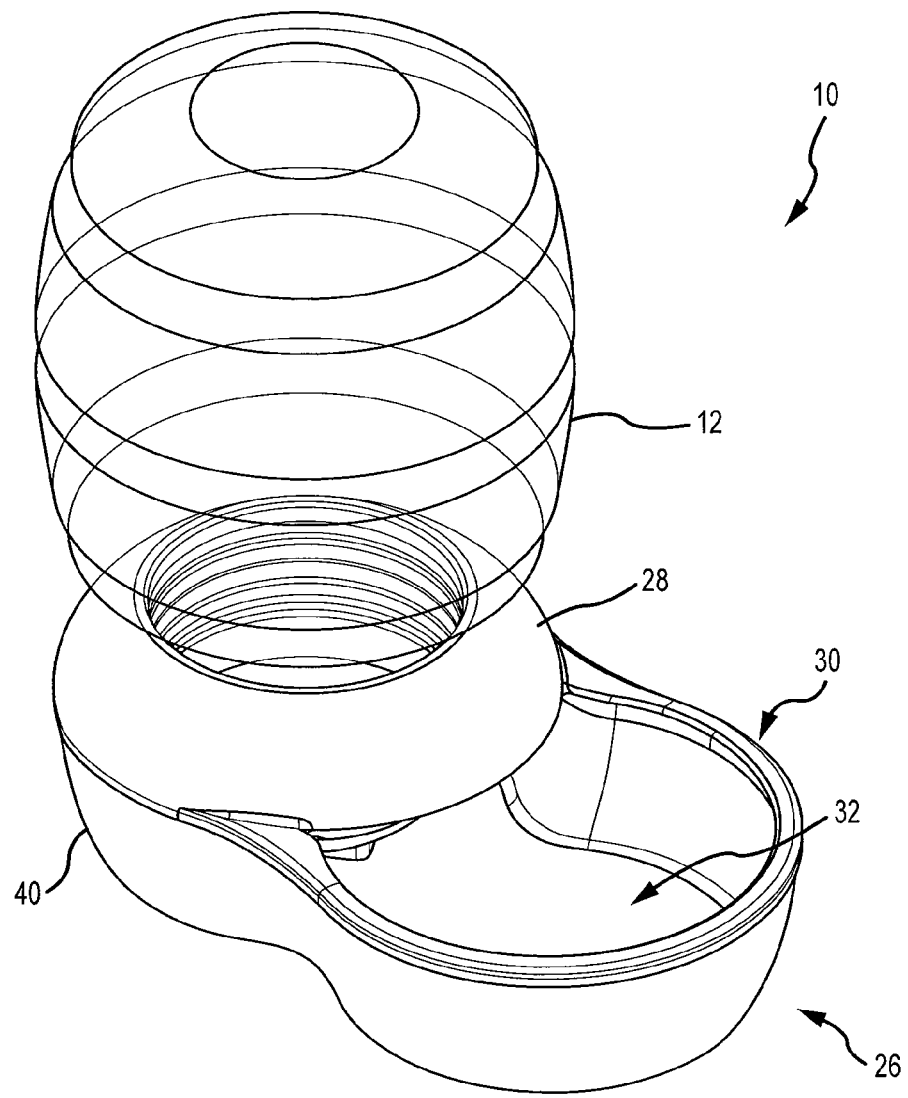
FIG. 1 illustrates a top isometric view of an embodiment of the pet water filtration system.
Figure 2:
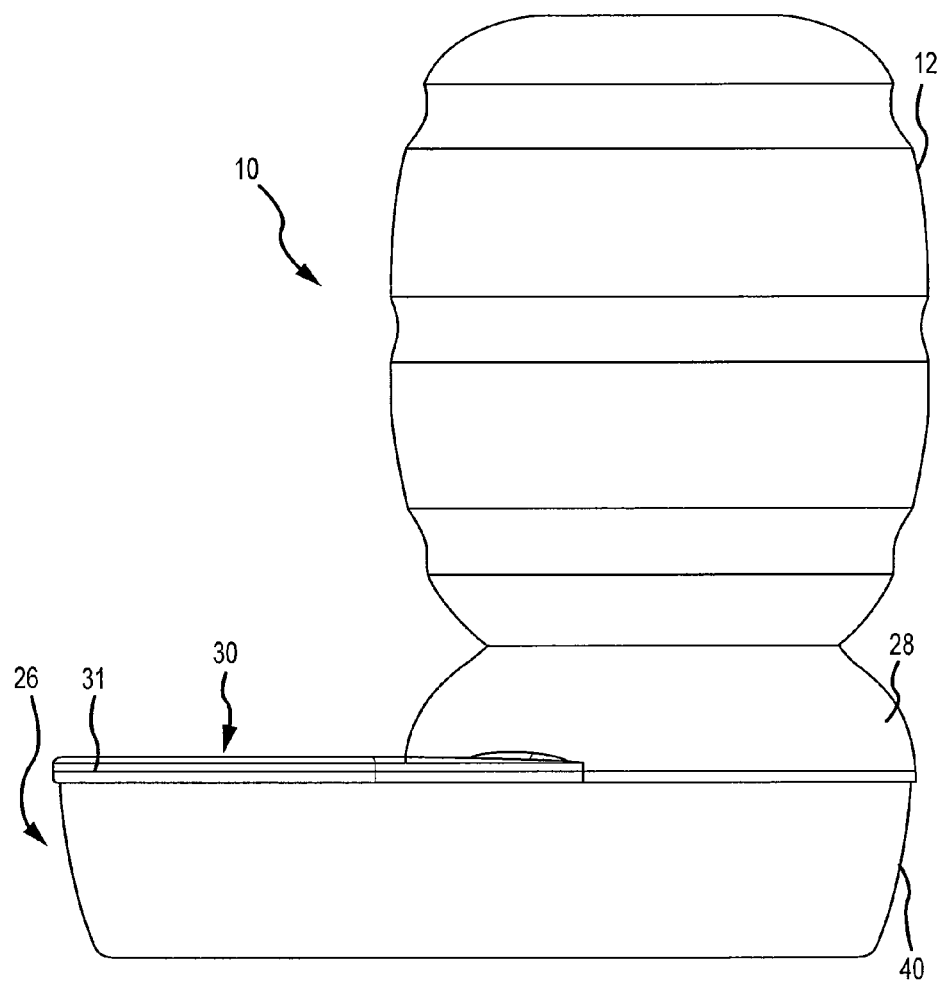
FIG. 2 illustrates a right elevation view of the pet water filtration system.
Figure 3:
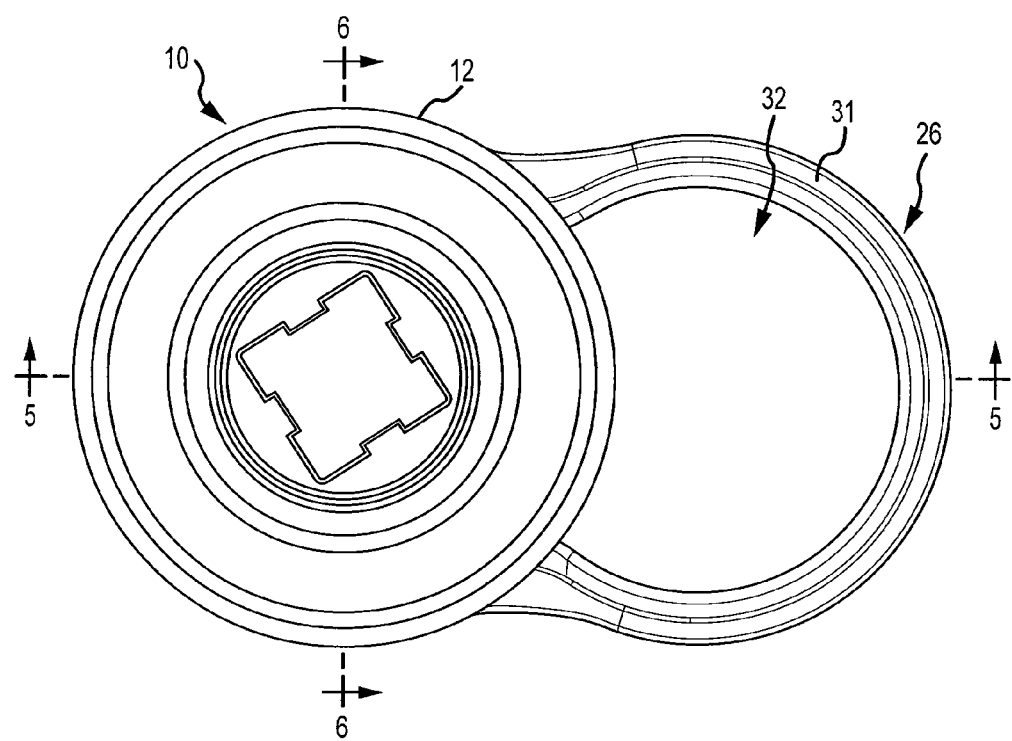
FIG. 3 illustrates a top plan view of the pet water filtration system.

FIG. 1 illustrates a top isometric view of the water filtration system; FIG. 2 illustrates a right elevation view of the water filtration system; and FIG. 3 illustrates a top plan view of the water filtration system. Referring to FIGS. 1-3, according to some embodiments, the water filtration system 10 may include a water tank 12 or water supply or water storage. The water tank 12 is operatively connected to an interior container 16 or core (shown in FIG. 4), and the water tank 12 and interior container 16 are removably attached to a base 26. The water tank 12 holds water or other fluids to be provided to the animal. The water tank 12 may be substantially cylindrical shaped and generally hollow. It should be noted that the water tank 12 may be designed in any appropriate shape and the cylindrical design is merely one embodiment. Additionally, the water tank 12 may be constructed out of a flexible material, such as plastic.

Figure 4:
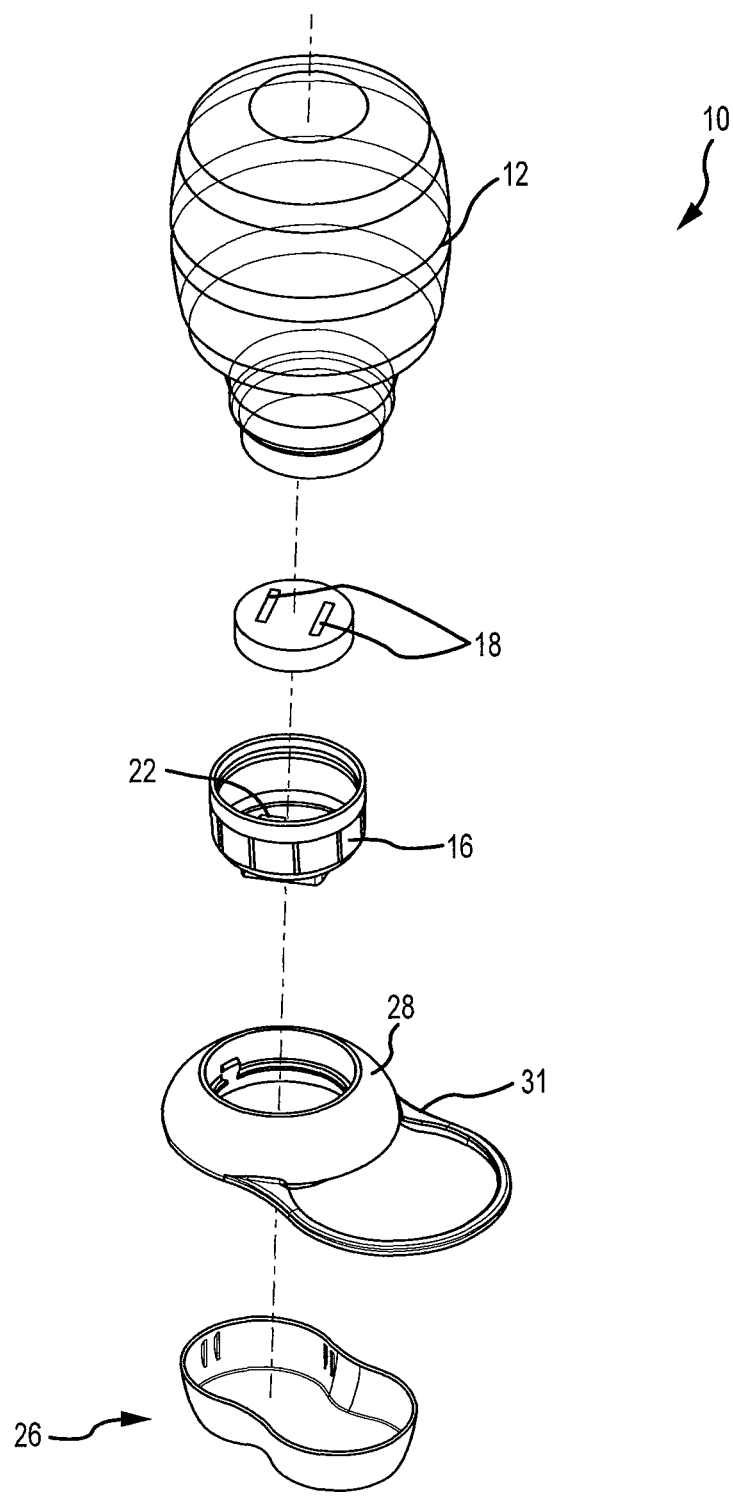
FIG. 4 is an exploded view of the pet water filtration system.
Figure 5:
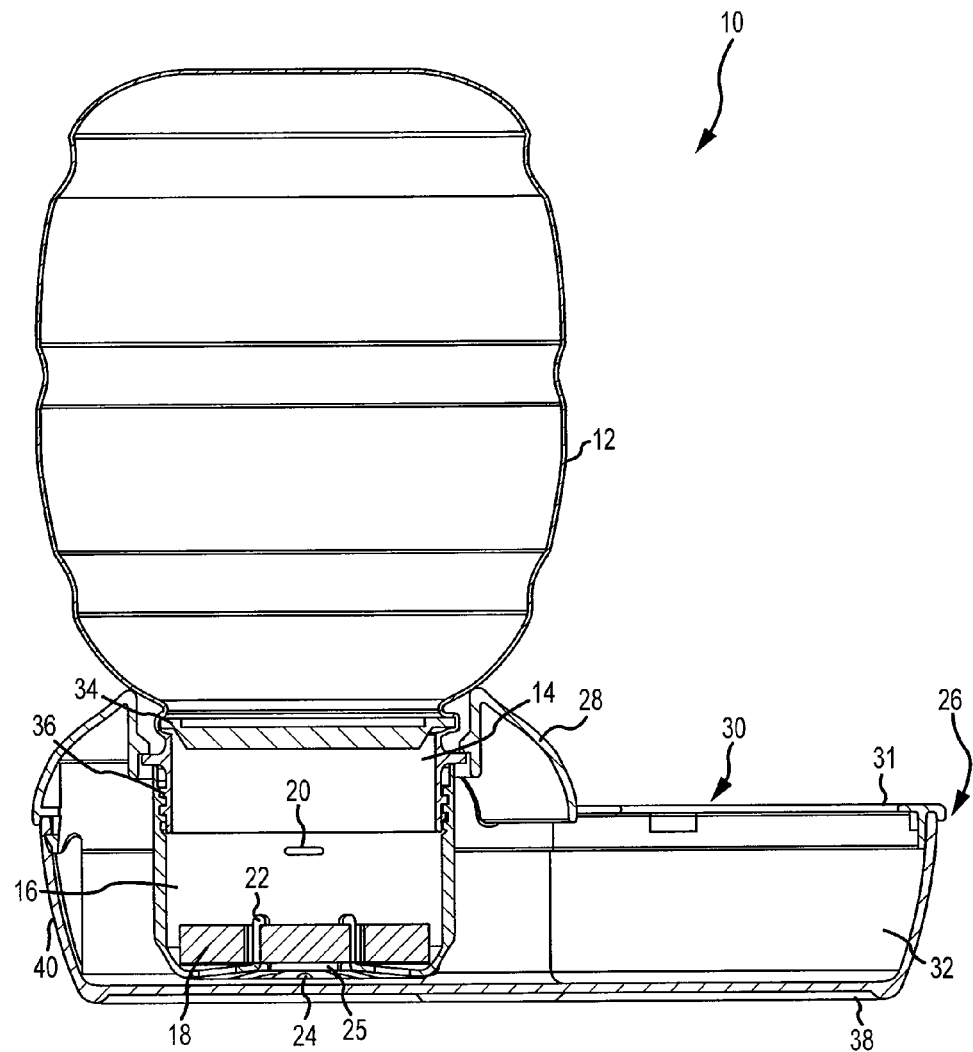
FIG. 5 illustrates a right side cross-sectional view of a pet water filtration system viewed along line 5-5 in FIG. 3.

FIG. 4 illustrates an exploded view of the water filtration system; FIG. 5 illustrates a cross-sectional view of the water filtration system viewed along line 5-5 in FIG. 3. Referring now to FIGS. 4 and 5, the water tank 12 may include a neck 14 having a passageway for the fluid. The neck 14 may include threading 36 or other types of attachment mechanisms, to attach the water tank 12 to the interior container 16. Additionally, the threading 36 may also be used to secure the water tank 12 to the base 26. The neck 14 of the water tank 12 may be concealed via a lip 28. In this embodiment, the inner connections, that is, the threading 36 and fluid passageway may be hidden from view thereby providing a more refined appearance.

The water tank 12 may also include a funnel 34 at its distal end. The funnel 34 may be located between the end of the water tank 12 and the neck 14. The funnel 34 may be included in some embodiments, in order to better direct the water or fluid from the water tank 12 to the interior container 16. Additionally, the funnel 34 may include other features, such as a filter or screen to prevent particles in the water tank 12 from entering the interior container 16. However, the funnel 34 may be omitted in other embodiments.

Figure 7:
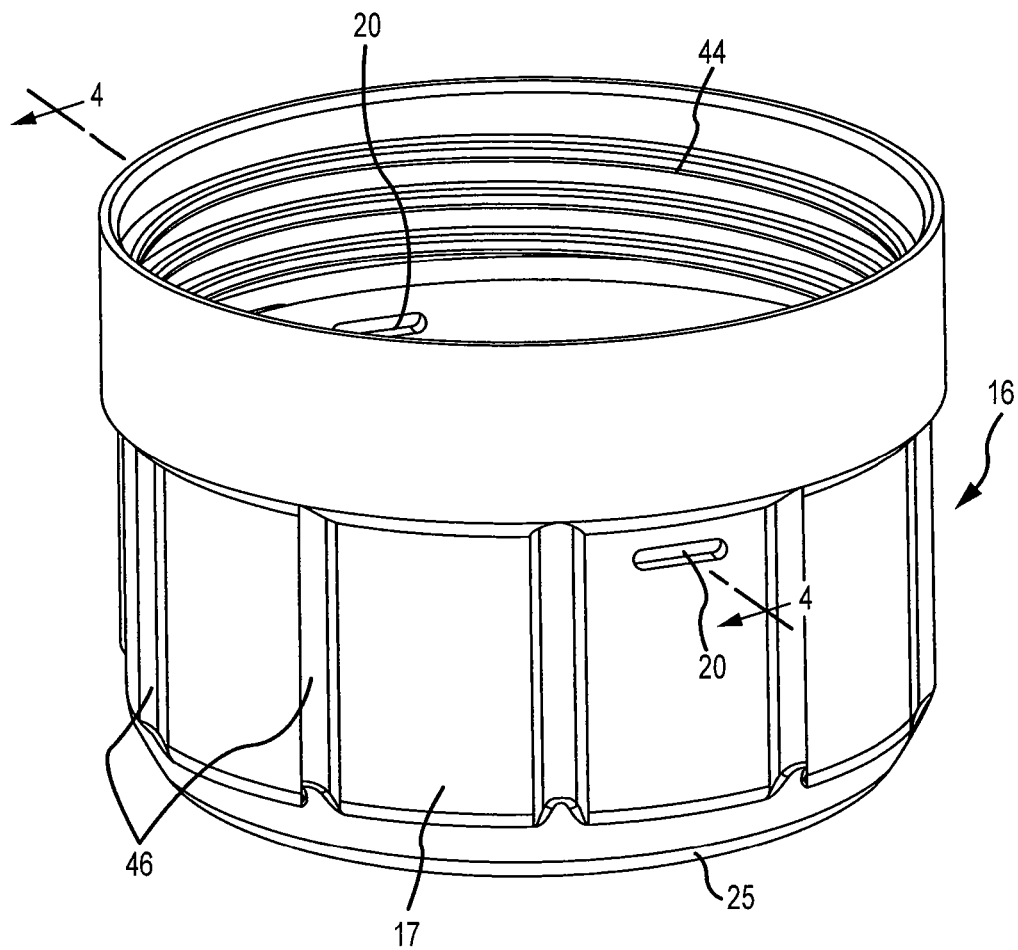
FIG. 7 illustrates a perspective view an interior container for the water filtration system.

The water tank 12 is fluidly connected to the interior container 16 via the neck 14. The water tank 12 and the interior container 16 may be attached via complementary threading, on the neck 14 and on the interior container 16. As shown in FIG. 7, the interior container 12 may contain threading 44 in the inner portion of the body 17. The threading 44 of the interior container 16 is designed to be complementary to the threading 36 of the water tank 12, allowing the two to be thredly attached. The water tank 12 and the interior container 16 may be attached to help prevent leaks as water travels between the water tank 12 and the interior container 16. In other embodiments, the interior container 16 and the water tank 12 may be connected in other implementations, e.g., snap-fit, locking configuration, tabs, or the like.

Figure 8:
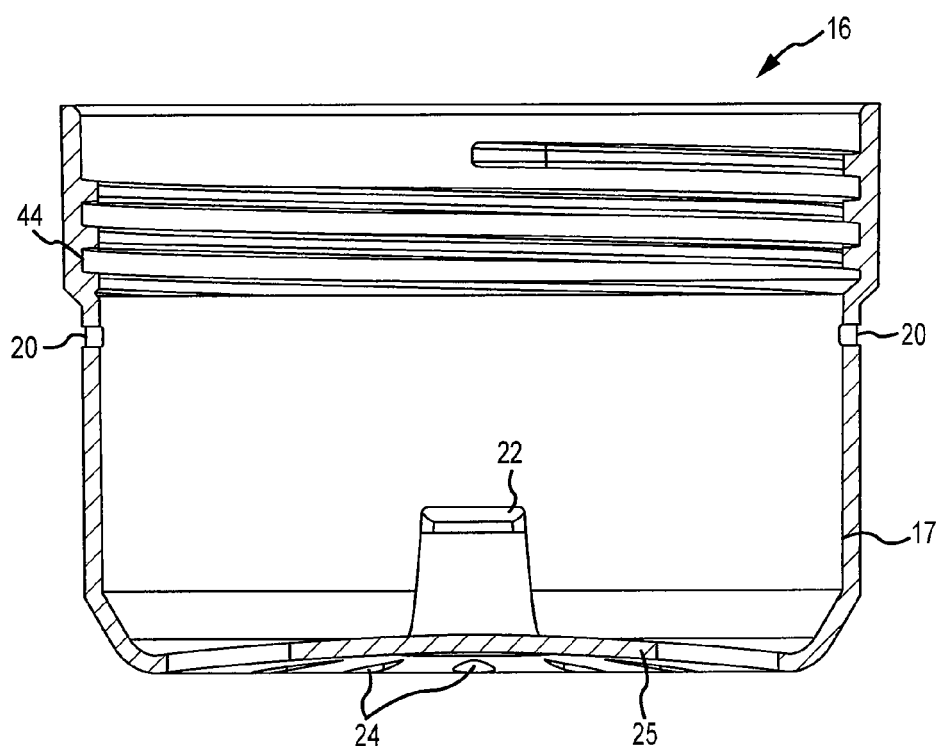
FIG. 8 illustrates a cross-sectional view of the interior container without a filter attached, viewed along line 8-8 in FIG. 3.

A perspective top view of the interior container is illustrated in FIG. 7 and a cross-sectional view of the interior container is shown in FIG. 8. Referring now to FIGS. 5, 7 and 8, the interior container 16 may include a generally cylindrical body 17 having ridges 46 spaced along the outer side of the body 17. The ridges 44 may be included in some embodiments in order to allow the user to better grip the interior container 16. For example, if the user wishes to clean the interior container 16 or otherwise remove it from the system 10, the ridges 44 provide a gripping surface. However, in some embodiments, the ridges 44 may be omitted.

Additionally, the body 17 may include level apertures 20, which may help determine the water fill level of the bowl 32. This is because, in some embodiments, when the water level in the bowl 32 is approximately equal the height of the level apertures 20 the pressure may be approximately equal between the exterior and interior of the interior container 16 and/or water tank 12. This pressure equalization may substantially prevent water from flowing from the water tank 12 into the bowl 32, thus substantially stopping the bowl 32 from filling further with water. However, if the height of the water in the bowl 32 is approximately lower than the level apertures 20 there may be a pressure differential between the interior and exterior of the interior container 16, which may cause water to flow from the water tank 12 into the bowl 32. Therefore, in these embodiments, if the level apertures 20 are located 2 inches from the bottom of the bowl 32, the water level (when the water tank 12 is full or substantially full) may be approximately 2 inches high.

Figure 6:
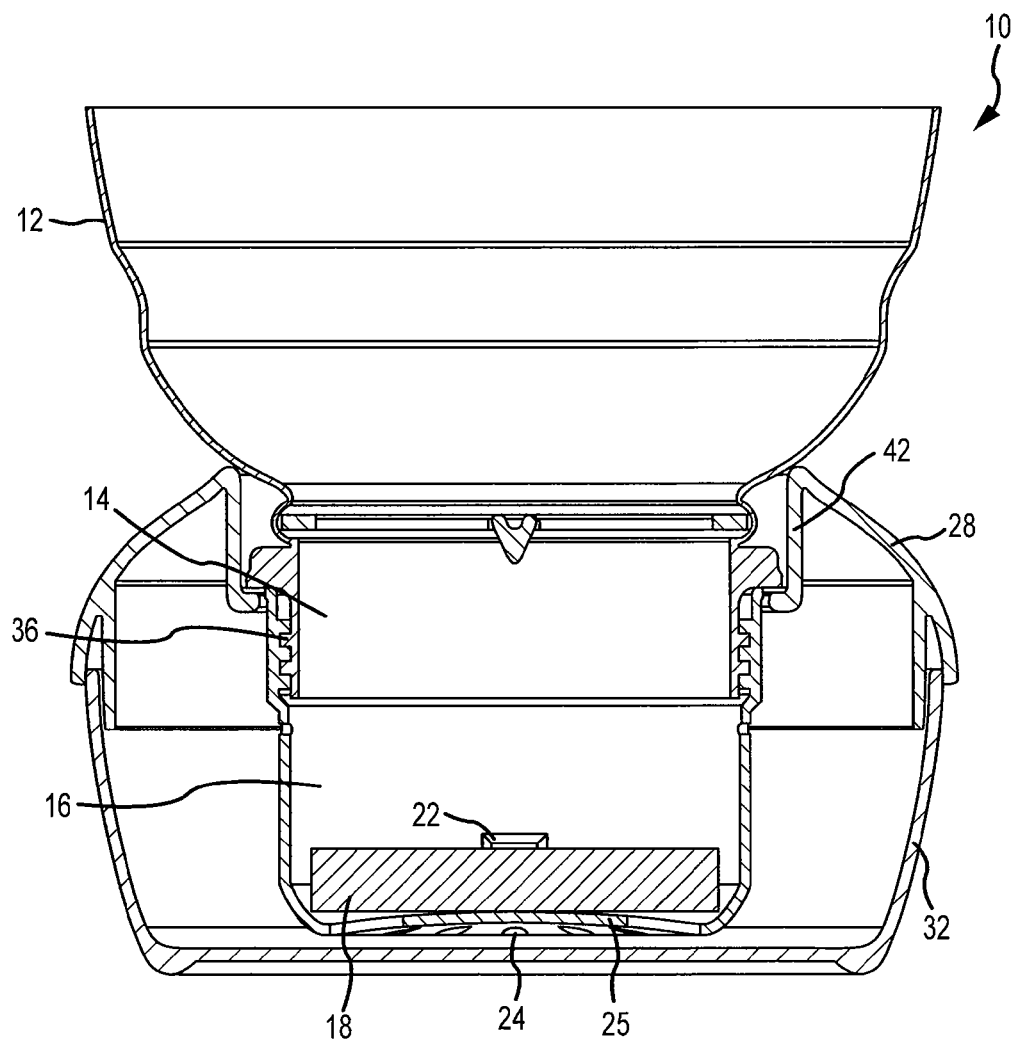
FIG. 6 illustrates a front cross-sectional view of the pet water filtration system.

As can be seen in FIGS. 5 and 6, the bottom 25 of the interior container 16 may be slightly raised above a top surface of the base 26. These embodiments allow fluid to more easily be transported between the water tank 12 and the base 26, because the interior container 16 may not be sealed against the top surface of the base 26. The bottom 25 of the interior container 16 also may include multiple container apertures 24 and a filter 18. Additionally, in some embodiments, the body 17 may also include apertures located around the sides. In these embodiments, water may more easily flow from the base 26 to the interior container 16 and vice versa.

The container apertures 24 located on the bottom 25 of the interior container 15 fluidly connect the water tank 12 to the base 26 and, as there is a separation between the bottom 25 of the interior container 16 and the base 26, water may pass underneath the interior container 26. Additionally, as the container apertures 24 in the bottom 25 of the interior container 16, allows water to flow between the interior container 16 and the base 26. In some embodiments, the interior container 16 may be located beneath the water fill line of the base 26 or bowl 32. In these embodiments, the interior container 16 may be submerged within water when the bowl 32 is full. This embodiment allows the water stored in the base 26 to be re-circulated through the filter 18 attached to the bottom 25 of the interior container 16.

In addition to fluidly connecting the interior container 16 with the base 26, the container apertures 24 may also act as a screen or filter, preventing large particles from traveling between the water tank 12 and the interior container 16.

Referring to FIGS. 1, 4-6 and 8, in some embodiments the filter 18 may be secured to the bottom 25 of the interior container 16 via attachment hooks 22. The attachment hooks 22 may be formed integrally with the bottom 25 or body 17 of the interior container 16, or may be releasably attached to the bottom 25 of the interior container 16. The attachment hooks 22 secure the filter 18 in place, while allowing easy replacement of the filter 18. For example, the attachment hooks 22 prevent the filter 18 from substantially moving, but also allow the filter 18 to be slid or pulled out from under the attachment hooks 22. In some embodiments the attachment hooks 22 may be omitted. For example, the filter 18 may be unattached and rest along the bottom 25 of the interior container (see the embodiment illustrated in FIG. 13) or in other embodiments, the filter 18 may be formed of a separate screen above or integrated with the bottom 25 and/or sidewalls of the interior container 16.

The filter 18 may remove particles, chemicals, and other materials from the water supply, both from the water tank 12 and a water bowl 32 located in the base 26. In some embodiments, the filter 18 may be located beneath the water fill line or water level when the bowl 32 has water stored in it. In these embodiments, the filter 18 may be submerged in water when the bowl 32 is partially or completely full. Similarly, in the embodiment illustrated in FIG. 10, the filtering apertures 19 may be submerged in water when the bowl 32 is full or partially full.

The filter 18 may be any type of water filter, for example a carbon filter, charcoal water filter, carbon filter material, and so on. In some embodiments, the filter 18 may include additives to the main filter material. In these embodiments, the filter 18 may be a carbon filter and include as an additive, silver, which may inhibit the growth of bacteria. Other additives may be charged plastic particles that prohibit the growth of amoeba type debris that may be harmful to animals. Further, other additives may be added to the filter 18 to increase the filtering capabilities. Similarly, the filter 18 may be any shape and may be configured to be secured within the interior container 16. Additionally, the filter 18 may be one-use/replaceable or may be designed to be reusable. The filter 18 acts to filter water as it enters the base 26 from the water tank 12, as well as water as it flow through the apertures 24 into the interior container 16 from the base 26.

Referring again to FIGS. 4 and 5, the water filtration system 10 base 26 may include a top base 30 and a bottom base 38. The bottom base 38 includes a bowl 32 that provides the drinking supply to the animal. The bowl 32 may be shaped in any manner and includes an open region to allow the animal to access the water. The bowl 32 may be substantially hollow and include a portion that surrounds the inner container 16. For example, the bowl 32 may be shaped as two joined cylinders, such that one cylinder is exposed to the air (and allows an animal to drink water in the bowl) and the other cylinder is located beneath the water tank 12. In these embodiments, the bowl 32 may be formed integrally as the two cylinders, or may be two distinct pieces. Also, it should be noted that the bowl 32 may be any shape, and the disclosure of any shape is merely one embodiment.

In some embodiments, as the inner container 16 is suspended above the bottom base 38, water in the bowl 32 is able to flow under the inner container 16 and surround the inner container 16 on substantially all sides. In these embodiments, as discussed with respect to the filter 18, the water supply stored in the bowl 32 may be continuously filtered by the filter 18. For example, as an animal drinks the water in the bowl 32, the wind blows, or the water is otherwise disturbed, the water in the bowl 32 may be swirled around and otherwise rotated throughout the bowl 32. As this happens, water previously located in the bowl 32 may flow, via the apertures 24, into the interior container 16. As this happens, the filter 18 and the apertures 24 work together to remove particles, and the like from the water, which then re-enters the bowl 32 via the apertures 24.

Figure 9:
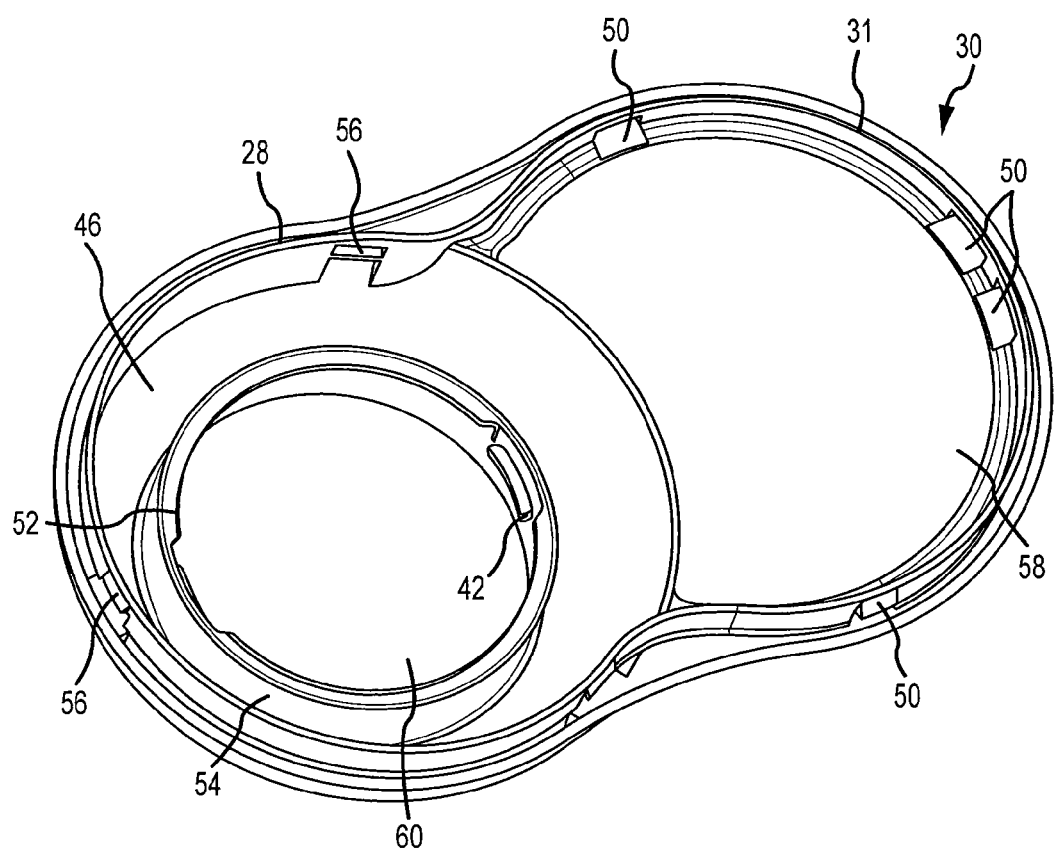
FIG. 9 illustrates a bottom isometric view of the top base of the water filtration system.

FIG. 9 illustrates a bottom isometric view of the top base 30 removed from the other components of the water filtration system 10. In some implementations, the top base 30 may be configured to be removably attached to the water tank 12, the bottom base 38 and interior container 16, in other embodiments the top base 30 may be integrated with the bottom base 28. The water tank aperture 60 and the bowl aperture 58 may be configured to receive the water tank 12, interior container 16 components and the bowl 32, respectively. Additionally, the water tank aperture 60 and the bowl aperture 58 may be circular shaped, or otherwise include a complementary shape to the water tank 12 and bowl 32. Furthermore, the top base 30 may be configured to snap onto the embodiment of the bowl 32 that includes two joined cylinders. In this embodiment, a first cylinder of the bowl 32 may be received in the tank aperture 60 and be configured to receive the interior container 16, and the second cylinder may be received within the bowl aperture 58.

In these embodiments, the top base 30 may include a variety of tabs which may be used to snap each component into place. For example, the water tank tabs 42 are configured to join with the neck 14 of the water tank 12 to secure the water tank 12 into place, as well as stabilize the water tank 12 within the base 26. The bowl tabs 50 may be used to secure the bottom base 38 and bowl 32 to the top base 30. In these embodiments, the bowl tabs 50 help to prevent the bowl 32 from moving while an animal drinks. The top base 30 also includes the lip 28 used to conceal the attachment between the water tank 12 and the interior container 16. The lip 28 may include lip tabs 56 to secure the neck 14 to the top base 26.

Additionally, a tank wall 54 may be used to support the water tank 12 and interior container 16 connection, as well as host the water tank tabs 42. The tank wall 54 may additionally include a top ring 54, which may be used to insure the connection between the tank wall 54 and the water tank 12 and interior container 16. The tank wall 54 may be shaped generally in the same shape as the neck 14 and the interior container 16, as in some embodiments the interior container 16 and neck 14 may connect via the water tank aperture 60 surrounded by the tank wall 54. Furthermore, the tank wall 54 may be supported via a circular scoop 46. The scoop 46 surrounds the tank wall 54 and may be configured to have an generally downward sloping shape. This shape allows an outside portion of the scoop 46 to be convex. The scoop 46 may catch water that flows out of the water tank 12 and interior container 16 connection. However, it should be noted that the top base 30 may be configured in any suitable manner, in order to support the water tank 12, interior container 16 as well as provide a location for the bowl 32.

Figure 10:
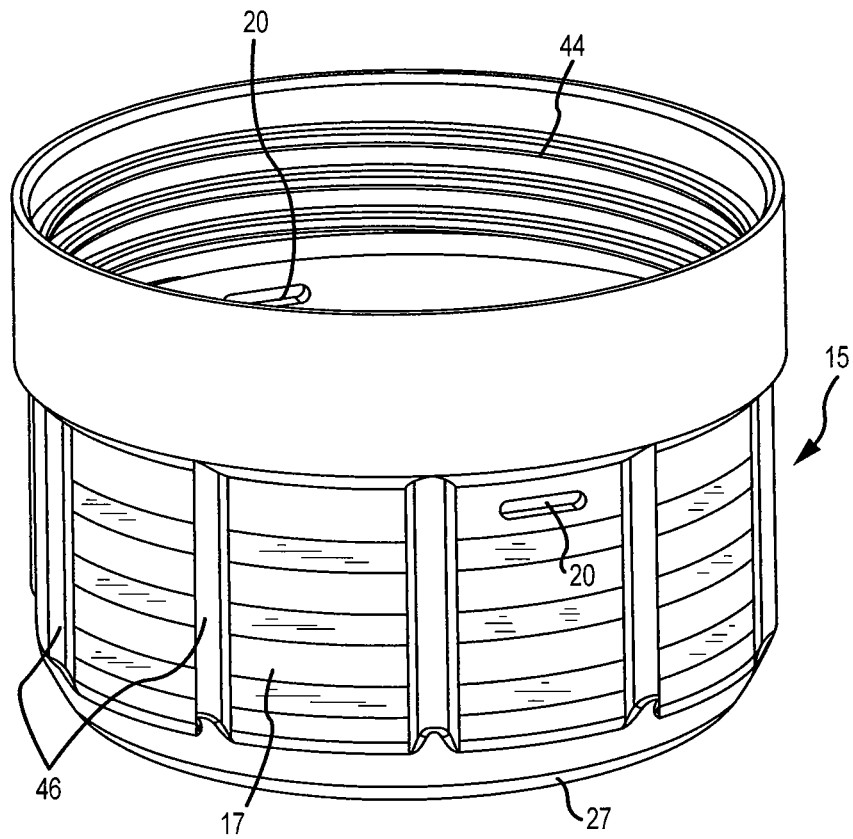
FIG. 10 illustrates a top isometric view of a second embodiment of the interior container for the water filtration system.
Figure 11:
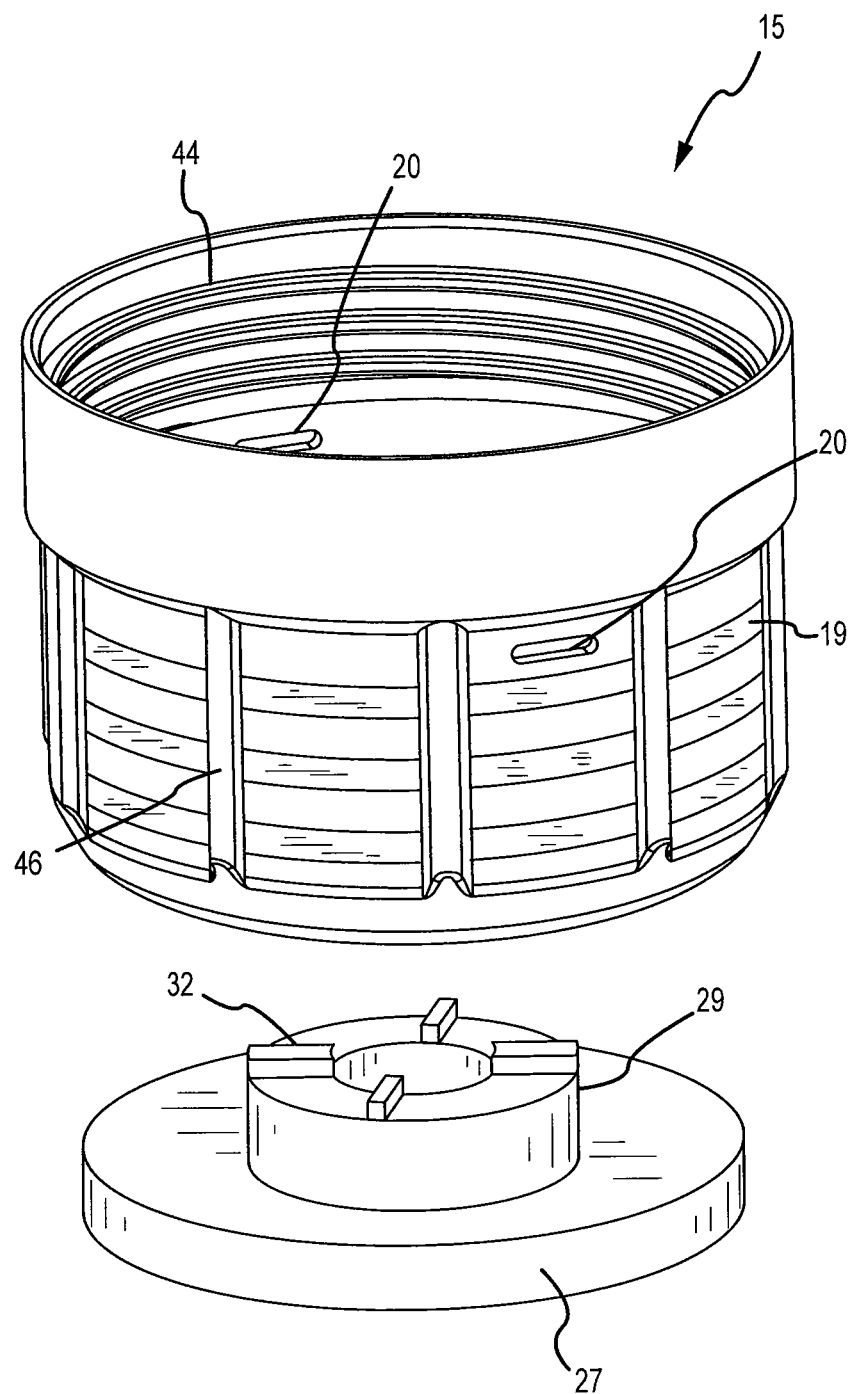
FIG. 11 illustrates an exploded view of the second embodiment of the interior container shown in FIG. 10.

FIGS. 10 and 11 illustrate a second embodiment of the interior container 15. In this embodiment, the interior container 15 may include filtering apertures 19 dispersed along the sidewalls of the body 17. The filtering apertures 19 may be open to allow fluids to flow between the body 17 and the base 26. Additionally, in some embodiments, the filtering apertures 19 may include a filtering material disposed within the filtering apertures 19. In these embodiments, the filtering material may filter fluids traveling between the base 26 and the sidewalls of the interior container 15. The filtering material may be charcoal, carbon or the like (see e.g., the materials discussed above with respect to the filter 18). The filtering material may be inserted into all or a portion of the filtering apertures 19. These embodiments allow the water to enter the interior container 15 via the sidewalls of the body 17. As with the first embodiment of the interior container 16, the second embodiment of the interior container 115 may be substantially submerged in water when the bowl 32 is substantially or completely full.

Additionally, in this second embodiment illustrated in FIGS. 10 and 11, the interior container 15 may also include a cap 27 which may form the bottom surface of the interior container 15. The cap 27 may include a conical extension 29 extending from the top surface of the cap 27. The conical extension 29 may also include a flow aperture 32. The flow aperture 32 transports the fluid from the water tank 12 through the interior container 15 to the base 26. The conical extension 29 may also act to substantially funnel the water through the flow aperture 32. A screen 31 or other structure may be placed over the flow aperture 32 to add an additional level of filtering to water exiting the interior container 15.

Figure 12:
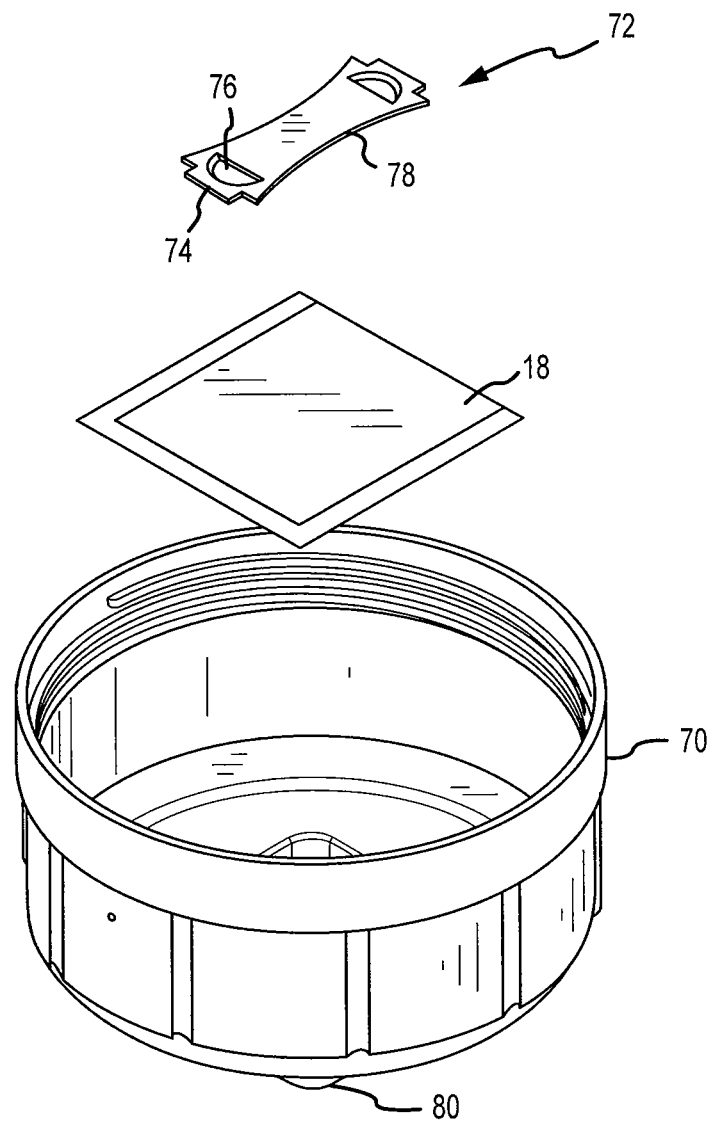
FIG. 12 illustrates an exploded view of a third embodiment of the interior container, filter and filter strap for the water filtration system.
Figure 13A:
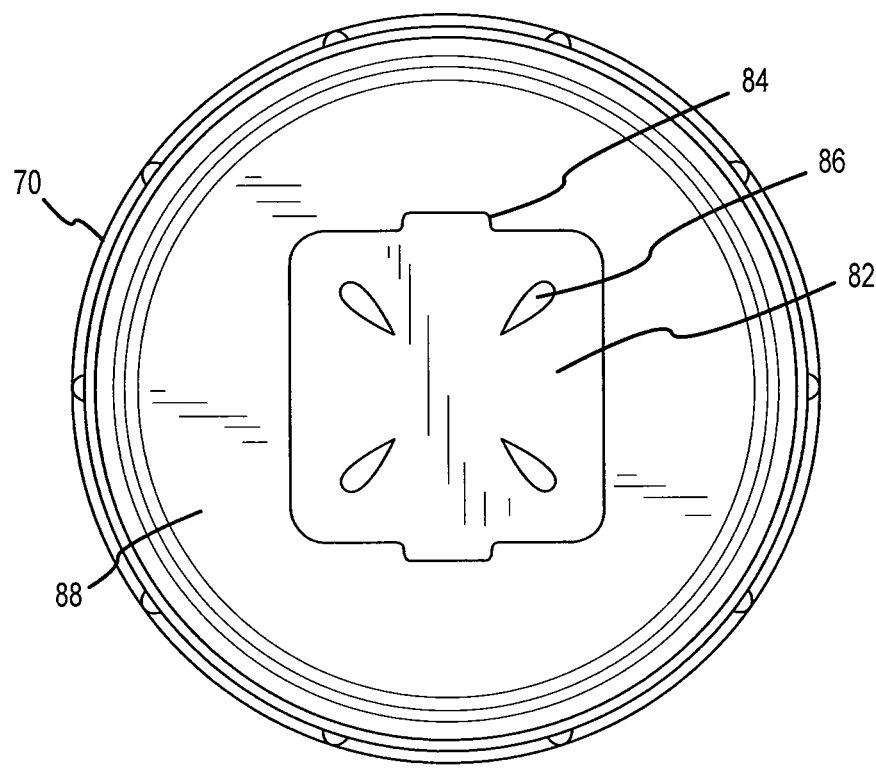
FIG. 13A illustrates a top plan view of the third embodiment of the interior container shown in FIG. 12.
Figure 13B:
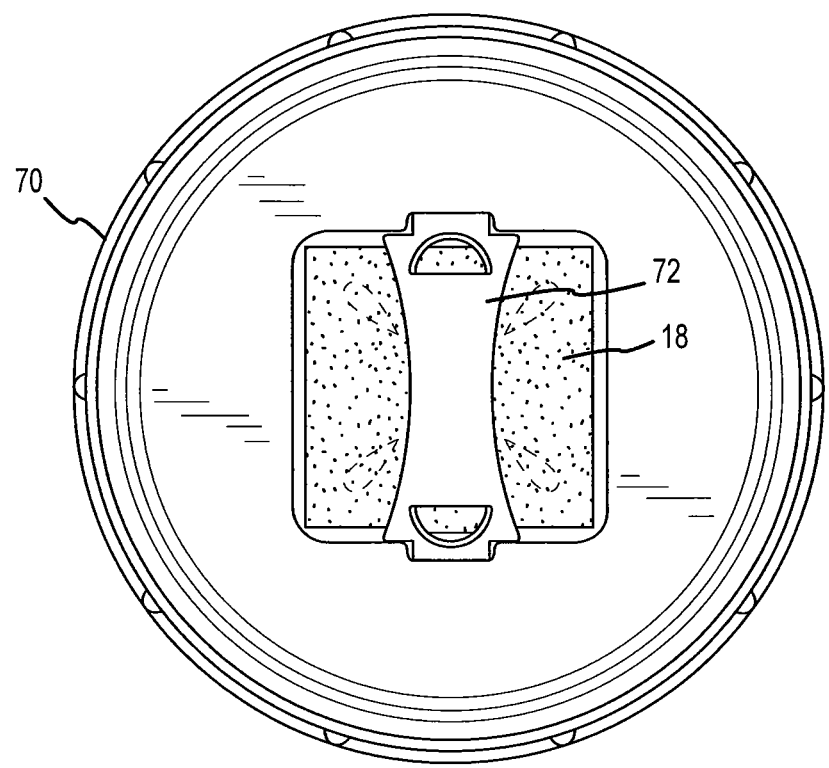
FIG. 13B illustrates a top plan view of the third embodiment of the interior container with the filter and filter strap secured into the interior container.
Figure 14:
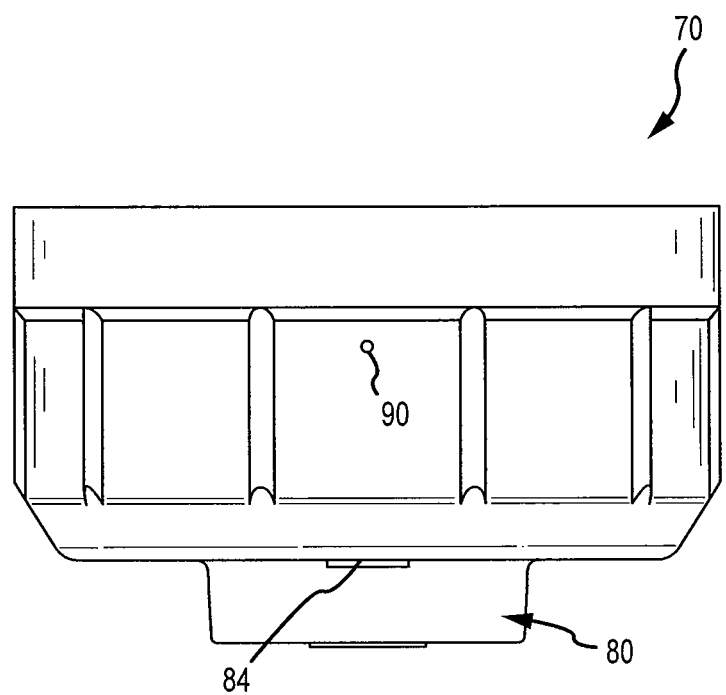
FIG. 14 illustrates an elevation view of the third embodiment of the interior container.

FIGS. 12-13B illustrate a third embodiment of the interior container. In this embodiment, the interior container 70 includes a depressed filter container 80 that extends past the bottom surface 88 of the interior container 70. In this embodiment, the filter container 80 may be configured to hold the filter 18 within the interior container 70, and as such the attachment hooks 22 may be omitted. Additionally, as the filter container 80 is lower than the bottom surface 88 of the interior container 70, the filter container 80 may be submerged within the water when the bowl 32 is filled or partially filed.

Similar to the first embodiment of the interior container 16, the bottom surface 88 of the interior container 70 and/or the bottom 82 of the filter container 80 may include apertures 86 to allow water to travel between the interior container 70 and the water tank 12. These embodiments allow the filter 18, which when stored within the filter container 70, to filter water as it travels between the water tank 12, the interior container 70 and the bowl 32. Further, also similar to the first embodiment of the interior container 15, the third embodiment of the interior container 70 may include level apertures 90. The level apertures 90 may be approximately the same as the level apertures 20 in the first embodiment, and may determine the water level of the bowl 32 when the water tank 12 is full or substantially full. For example, if the level apertures 90 are located 1 inch from the bottom of the bowl 32, the water level in the bowl 32, when full or substantially full, may be approximately 1 inch deep.

The filter container 80 may be similarly shaped to the filter 18, such that the filter 18 may rest within the filter container 80. In some embodiments, the filter container 80 may include strap receiving apertures 84 along sides of the filter container 80. The strap receiving apertures 84 may extend downward from the sidewall of the filter container 80 where the filter container 80 extends from the bottom surface 88 of the interior container 70. Although the strap receiving apertures 84 may be any shape or size, in one embodiment there are two strap receiving apertures 84 and both are substantially rectangular, however other implementations are possible.

The strap receiving apertures 84 may be used to secure the filter 18 within the filter container 80. For example, in some embodiments, the filter 18 is placed within the filter container 80 and a strap 72 is placed over the filter 18. The sides or tabs 74 of the strap 72 may then be inserted into the strap receiving apertures 84 securing the filter 18 in place within the filter container 80.

The strap 72 may be substantially flexible and include a substantially rectangular body 78 any may include two tabs 74 at the distal ends. In some implementations the strap may be rubber, fabric, metal, or the like. In embodiments where the strap 72 may be flexible, when pressure is applied to the ends or near the ends, the strap 72 may bend upwards. The ends of the strap 72 may form tabs 74, which as discussed above, may be used to secure the strap 72 into the strap receiving apertures 84.

Additionally, the strap 72 may include finger apertures 76 along the body 78. In these embodiments, the finger apertures 76 may be used to assist a user in removing the tabs 74 from the strap receiving apertures 84, thus removing the strap 72. In one implementation, a user may insert one or more of his or her fingers into the finger apertures 76. Once the finger(s) have been inserted the user may then slightly squeeze or apply a pressure towards the center of the strap 72. The strap 72 then may flex upwards allowing it to more easily be grasped by the user and removed. This may be helpful, because in some implementations the strap 72 may lay essentially flush on top of the filter 18, especially after water has been deposited on top of the filter 18 from the water storage tank 12. In some embodiments the finger apertures 76 may be substantially half-moon shaped, or otherwise configured to allow a user's finger to be inserted therein. For example, in some embodiments, the finger apertures 72 may be substantially circular, oval or the like. Additionally, it should be noted that in other embodiments, the finger apertures 76 may omitted and other user assisting devices could be used, for example gripping prongs, tabs or the like.

The strap 72 may be secured to the filter 18 or separate from the filter 18. For example, as illustrated in FIG. 12 the strap 72 is a separate element from the filter 18 and is used primarily to secure the filter 18 in place. However, in other embodiments, the strap 72 may be secured to the filter 18 and be used to additionally pull the filter 18 out of the filter container 18.

It should be noted that any of the embodiments illustrated for the interior container 15, 16, 70 may be implemented with any of the features illustrated in any of the other embodiments. Additionally, the strap 72 may be used with any of the other filter 18 and/or interior container 15, 16, 70 embodiments.

The foregoing describes some example embodiments to achieve a continuous water filtration watering system for animals. Although the present invention has been described with reference to illustrated embodiments, persons skilled in the art will recognize that changes may be made in form and detail without departing from the spirit and scope of the invention. Indeed, in other embodiments, the water filtration design may be used in other applications besides pet watering devices, for example in water displays or fountains. Furthermore, it should be appreciated that other components may be added to the water filtration system. For example, a water pump may be used to circulate the water in the bowl 32 and in the interior container 16 or to pump water from the water tank 12 into the interior container 15. Accordingly, the specific embodiments described herein should be understood as examples and not limiting the scope of the disclosure.

What is claimed is:

1. A water filtration system for animals comprising:
a water storage;
an inner container fluidly connected to the water storage, wherein the inner container comprises:
a filter; and
at least one bottom aperture, wherein the bottom aperture is located at a bottom of the inner container; and
a bowl, wherein the bowl is fluidly connected to the inner container, and
wherein the inner container further comprises attachment hooks for securing the filter.

2. The water filtration system of claim 1, wherein the inner container further comprises a level aperture on a sidewall of the inner container, wherein the level aperture regulates a water level in the bowl.

3. The water filtration system of claim 1, wherein the inner container is suspended within the bowl.

4. The water filtration system of claim 3, wherein there is a two-way water flow between the interior container and the water bowl.

5. The water filtration system of claim 1, wherein the water storage supplies water to the bowl.

6. The water filtration system of claim 1, wherein the filter is disposed within the bowl and is a predetermined distance from a bottom of the bowl.

7. The water filtration system of claim 6, wherein the filter is submerged in water when the bowl is at least partially full of water.

8. A watering device for an animal comprising:
a water storage;
a bowl configured to hold water;
a water passageway fluidly connecting the water storage and the bowl;

a filter disposed in the water passageway, wherein the filter is configured to be positioned beneath a water fill level of the bowl; and a core operatively connected between the water storage and the bowl, wherein the core is configured to secure the filter;

wherein the core is configured to be partially submerged in the bowl; and wherein the core further comprises:

attachment hooks, wherein the attachment hooks are configured to secure the filter; and a level aperture, wherein the level aperture is configured to substantially determine a water depth of the bowl.

9. The watering device of claim 8, wherein the core further comprises apertures located on a bottom of the core, wherein the apertures fluidly connect the bowl and the water storage.

10. The watering device of claim 8, wherein the bowl further comprises:

a first portion, configured to provide an animal access to water; and a second portion, configured to receive water from the water storage.

11. The watering device of claim 10, wherein the first portion and the second portion are substantially cylindrically shaped.

12. A watering device for an animal comprising:

a water storage;

a bowl configured to hold water;

a water passageway fluidly connecting the water storage and the bowl; and a filter disposed in the water passageway, wherein the filter is configured to be positioned beneath a water fill level of the bowl;

wherein the bowl further comprises:

a first portion, configured to provide an animal access to water; and a second portion, configured to receive water from the water storage;

wherein the first portion and the second portion are substantially cylindrically shaped; and wherein the first portion is located substantially beneath the water passageway.

13. A filtration system for animals comprising:

a tank;

a base including a bowl;

the tank being structured to be situated on the base;

a filter;

an element structured to he situated on the tank, the element comprising a retention device structured to retain the filter adjacent the tank;

wherein the retention device comprises at least a first hook configured to secure the filter adjacent the tank.

14. The filtration system of claim 13 wherein the element comprises a bottom portion, the bottom portion having at least a first aperture that is structured to permit a liquid in the tank to flow into the bowl.

15. The filtration system of claim 13 wherein the element comprises at least a first level aperture that is structured to regulate a liquid level in the bowl.

16. The filtration system of claim 13 wherein the bowl includes a bottom, and wherein the filter is a predetermined distance from the bottom.

17. The filtration system of claim 16 wherein the filter is submerged in liquid when the bowl is at least partially full of liquid.

18. A filtration system for animals comprising:

a tank;

a base including a bowl;

the tank being structured to be situated on the base;

a filter;

an element structured to be situated on the tank, the element comprising a retention device structured to retain the filter adjacent the tank;

wherein the element includes a depressed filter container.

19. The filtration system of claim 18 wherein the depressed filter container has at least a first strap receiving aperture, and wherein the retention device comprises at least a first strap configured to secure the filter within the depressed filter container.

* * * * *

UNITED STATES PATENT AND TRADEMARK OFFICE
CERTIFICATE OF CORRECTION

| | | |
|---|---|---|
| PATENT NO. | : 8,555,816 B2 | Page 1 of 1 |
| APPLICATION NO. | : 12/874708 | |
| DATED | : October 15, 2013 | |
| INVENTOR(S) | : Adam Weber et al. | |

It is certified that error appears in the above-identified patent and that said Letters Patent is hereby corrected as shown below:

Title Page: Item (74) Attorney, Agent, or Firm, line 2, "Mellott. LLC;" should read --Mellott, LLC;--.

In the Specification:
Column 2, line 15, "view an" should read --view of an--.
Column 2, line 51, "to located" should read --to be located--.
Column 2, line 63, "into ht interior container" should read --into the interior container--.
Column 3, line 47, "threadly" should read --threadably--.
Column 4, line 30, "Additionally, as the" should read --Additionally, the--.
Column 5, line 18, "it flow" should read --it flows--.
Column 6, line 24, "an" should read --a--.
Column 6, line 30, "tank 12, interior container 16" should read --tank 12 and interior container 16--.
Column 7, line 6, "filed" should read --filled--.
Column 7, line 43, "body 78 any may" should read --body 78 and may--.
Column 8, line 2, "may omitted" should read --may be omitted--.
Column 8, line 3, "for example gripping" should read --for example, gripping--.

Signed and Sealed this
Seventh Day of January, 2014

Margaret A. Focarino
*Commissioner for Patents of the United States Patent and Trademark Office*